United States Patent
Zhou

(10) Patent No.: US 11,495,021 B2
(45) Date of Patent: Nov. 8, 2022

(54) PICTURE ANNOTATION METHOD, APPARATUS, PROCESSING DEVICE, AND SYSTEM

(71) Applicant: Alipay (Hangzhou) Information Technology Co., Ltd., Zhejiang (CN)

(72) Inventor: Xi Zhou, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/360,401

(22) Filed: Jun. 28, 2021

(65) Prior Publication Data

US 2022/0027627 A1    Jan. 27, 2022

(30) Foreign Application Priority Data

Jul. 24, 2020   (CN) .......................... 202010720812.9

(51) Int. Cl.
*G06V 20/20* (2022.01)
*G06T 7/246* (2017.01)
*G06V 20/40* (2022.01)
*G06V 10/26* (2022.01)

(52) U.S. Cl.
CPC ............ *G06V 20/20* (2022.01); *G06T 7/248* (2017.01); *G06V 10/26* (2022.01); *G06V 20/40* (2022.01); *G06T 2207/10016* (2013.01)

(58) Field of Classification Search
None
See application file for complete search history.

(56) References Cited

U.S. PATENT DOCUMENTS

| | | | |
|---|---|---|---|
| 2013/0215273 A1* | 8/2013 | Kareev | G08G 1/0175 348/149 |
| 2014/0314275 A1* | 10/2014 | Edmondson | G06K 9/00718 382/103 |
| 2017/0083792 A1* | 3/2017 | Rodriguez-Serrano | G06T 7/10 |
| 2017/0332049 A1 | 11/2017 | Zhang | |
| 2020/0265231 A1* | 8/2020 | Li | G06K 9/627 |

FOREIGN PATENT DOCUMENTS

| | | |
|---|---|---|
| CN | 203340185 U | 12/2013 |
| CN | 107730906 A | 2/2018 |
| CN | 110381268 A | 10/2019 |
| CN | 111292530 A | 6/2020 |

OTHER PUBLICATIONS

Machine translation of CN 111292530 (Year: 2020).*
First Office Action of Chinese Application No. 202010720812.9, dated Sep. 8, 2020.

* cited by examiner

*Primary Examiner* — Vikkram Bali
(74) *Attorney, Agent, or Firm* — Finnegan, Henderson, Farabow, Garrett & Dunner, LLP

(57) ABSTRACT

A picture annotation method, includes: converting, into a video image, multiple pictures in a set of pictures to be annotated; performing video annotation on the video image to obtain an annotation result; and using the obtained annotation result as an annotation result of each picture in the set of pictures to be annotated according to a correspondence between a video frame in the video image and a picture in the set of pictures to be annotated.

18 Claims, 8 Drawing Sheets

PICTURE ANNOTATION METHOD, APPARATUS, PROCESSING DEVICE, AND SYSTEM

CROSS-REFERENCE TO RELATED APPLICATIONS

The present application is based upon and claims priority to Chinese Patent Application No. 202010720812.9, filed on Jul. 24, 2020, the entire content of which is incorporated herein by reference.

TECHNICAL FIELD

The present specification relates to the field of image processing technologies, and in particular, to a picture annotation method, apparatus, processing device, and system.

BACKGROUND

With the continuous development of image processing technologies, there are increasingly more scenarios that can use an image processing means to facilitate people's work and life. For example, in traffic monitoring, captured images may be used to determine whether vehicles or drivers violate traffic rules. In identification of traffic accidents or vehicle insurance, images of damaged parts of vehicles may be processed to determine the degree of vehicle damages.

In these scenarios, it may be necessary to annotate photographed images, for example, annotate vehicle violation locations, vehicle damage locations, and the like. Generally, an image annotation is performed manually. However, when there are a large number of images, for example, some businesses need multiple pictures photographed continuously, and the continuous images need to be annotated, content of pictures will be slightly different as a photographer moves or content is delayed with the photographing time although the pictures have the same photographing subject. It takes a long time to annotate subjects to be annotated in this series of similar pictures one by one, and the annotation efficiency may be relatively low.

SUMMARY

According to a first aspect of embodiments of the present specification, a picture annotation method includes: converting multiple pictures in a set of pictures to be annotated into a video image; performing video annotation on the video image to obtain an annotation result; and using the annotation result as an annotation result of each picture in the set of pictures to be annotated according to a correspondence between a video frame in the video image and a picture in the set of pictures to be annotated.

According to a second aspect of embodiments of the present specification, a picture annotation device includes: a processor; and a memory storing instructions executable by the processor, wherein the processor is configured to: convert multiple pictures in a set of pictures to be annotated into a video image; perform video annotation on the video image to obtain an annotation result; and use the annotation result as an annotation result of each picture in the set of pictures to be annotated according to a correspondence between a video frame in the video image and a picture in the set of pictures to be annotated.

According to a third aspect of embodiments of the present specification, a non-transitory computer-readable storage medium has stored therein instructions that, when executed by a processor of a device, cause the device to perform a picture annotation method, the method according to the first aspect.

In the picture annotation method, annotation of multiple continuous pictures is converted into video annotation. After multiple pictures to be annotated are converted into a video, video annotation may be performed on the video by using a video annotation algorithm, and an annotation result can be quickly obtained based on a video frame. Finally, a video result is mapped to original pictures to obtain annotation results of the original group of pictures. The picture annotation is converted to video annotation, and the efficiency and accuracy of picture annotation can be improved by using the continuity of the video.

BRIEF DESCRIPTION OF THE DRAWINGS

The accompanying drawings, which are incorporated in and constitute a part of this specification, illustrate embodiments and, together with the description, serve to explain the principles of the specification.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The described embodiments are merely examples of rather than all the embodiments consistent with the present application.

Picture annotation may be performed on a specified text, image, and the like in a picture. For example, the specified text, image, or other content in the picture may be annotated in the form of frame selection. The annotated picture may be used for vehicle violation query, vehicle loss assessment, target tracking, and the like. Some scenarios may require annotation of continuously photographed pictures to obtain corresponding information, especially for acquisition of information about objects in motion. For example, for vehicle violation capture, it may be necessary to continuously photograph vehicles to determine whether vehicles are in violation. Generally, picture annotation may require manual annotation, especially for the annotation of pictures obtained by continuous photographing, the workload is relatively large.

Embodiments of the present specification provide a picture annotation method, apparatus, processing device, and system. Although the present specification provides method operation steps or apparatus structure as described in the following embodiments or accompanying drawings, more steps or module units or partially fewer operation steps or module units after merging may be included in the method or apparatus. In steps or structures where there is no necessary causal relationship logically, the performing order of these steps or the modular structure of the apparatus is not limited to the performing order or modular structure shown in the embodiments of the present specification or the accompanying drawings. When the method or modular structure is applied in an actual apparatus, server, or terminal product, it can be performed sequentially or in parallel according to the method or modular structure shown in the embodiments or the accompanying drawings (for example, a parallel processor or multi-thread processing environment, or even an environment including distributed processing and server cluster).

Figure 1:
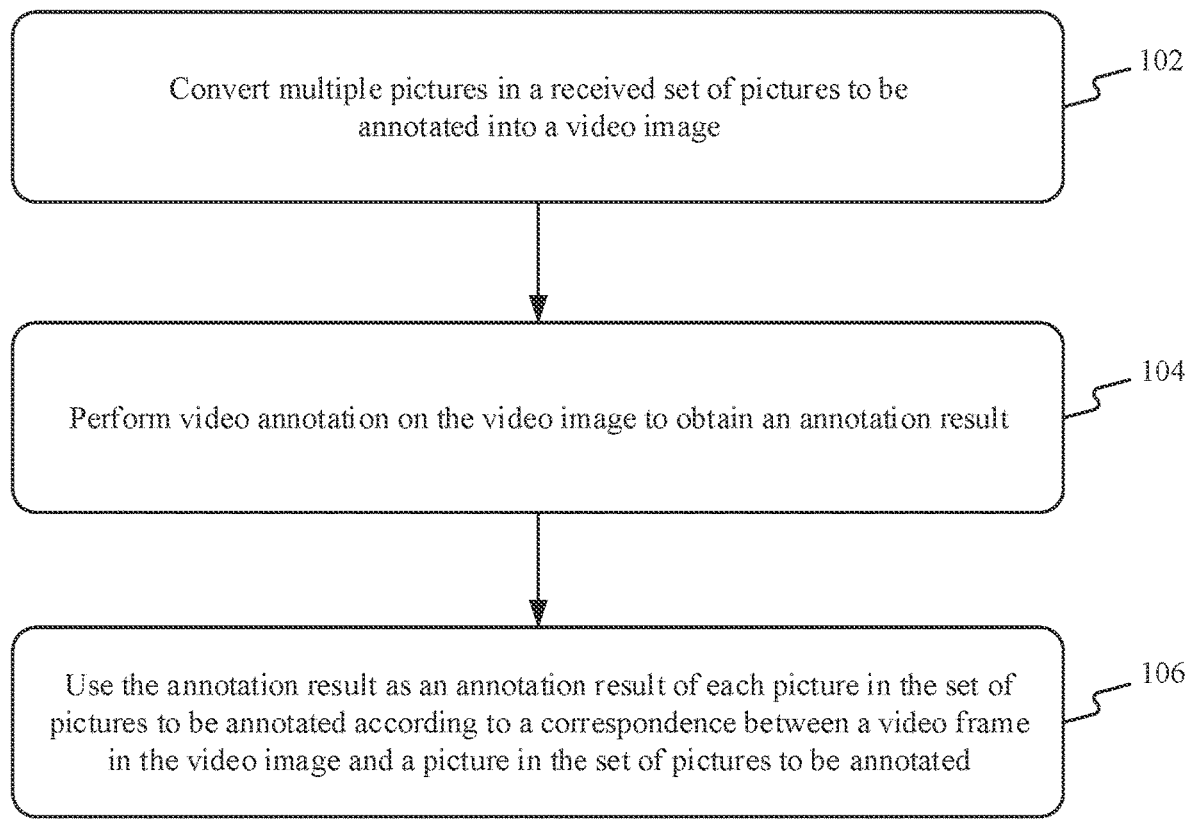
FIG. 1 is a flowchart of a picture annotation method according to an embodiment.

FIG. 1 is a flowchart of a picture annotation method according to an embodiment. For example, the method is applicable to a terminal device capable of performing image processing, such as a computer, a tablet, and a server. The method may include the following steps.

In step 102, multiple pictures in a received set of pictures to be annotated are converted into a video image.

In an embodiment, if a user needs to annotate a series of pictures, pictures that need to be annotated may be uploaded to a picture annotation apparatus, i.e., the terminal device, through a client such as a smart phone, a computer, a smart wearable device, and a tablet computer. In the embodiment, a series of pictures obtained by continuous photographing can be annotated, that is, a set of pictures to be annotated may include a group of pictures obtained by continuous photographing for example, a group of pictures captured continuously by traffic monitoring, a group of pictures photographed continuously on a damaged part of a vehicle rapidly, and so on. Generally, a group of pictures in the set of pictures to be annotated have the same photographing subject. As a photographer moves or content delays with the photographing time, content of each picture may vary slightly. After the set of pictures to be annotated is received, multiple pictures in the set of pictures to be annotated may be converted into a video image, that is, a group of continuously photographed multiple pictures in the set of pictures to be annotated may be converted into a video, and a video converter or another video conversion method may be used for conversion, which is not limited in the embodiment of the present specification.

In some embodiments, before converting multiple pictures in a received set of pictures to be annotated into a video image, the method further includes: receiving a set of pictures to be processed, wherein the set of pictures to be processed includes at least one group of multiple pictures obtained by continuous photographing; and receiving a picture annotation request, wherein the picture annotation request includes the set of pictures to be annotated, and the set of pictures to be annotated is a group of continuously photographed multiple pictures in the set of pictures to be processed.

In an embodiment, a user can upload multiple pictures, that is, a set of pictures to be processed. The set of pictures to be processed may include one or more groups of pictures obtained by continuous photographing, and each group of pictures continuously photographed may be pictures with the same photographing subject and similar picture content. The user can choose to perform picture annotation on multiple pictures specified in the set of pictures to be processed. After receiving the multiple pictures selected by the user, the picture annotation apparatus may perform picture annotation on the pictures selected by the user, for example, convert the multiple long pictures selected by the user into a video image, and then perform picture annotation processing.

For example, the user uploads 20 pictures to the picture annotation apparatus through the client, 10 of which are pictures photographed for traffic monitoring of vehicle A, the other 10 are pictures photographed for traffic monitoring of vehicle B, and a set of 20 pictures can be referred to as the above set of pictures to be processed. The user selects 10 pictures photographed for traffic monitoring of vehicle A to request picture annotation. A set of the 10 pictures photographed for traffic monitoring of vehicle A may be referred to as a set of pictures to be annotated, and the picture annotation apparatus, after receiving the picture annotation request sent by the user, may convert the 10 pictures in the picture annotation request into a video image, and the picture annotation processing may be performed based on the video image.

A group of continuously photographed multiple pictures in the set of pictures to be annotated may be a complete group of pictures, or some pictures in a group of pictures photographed continuously. For example, in the above example, 6 pictures among 10 pictures photographed for traffic monitoring of vehicle A are selected for annotation, and the specific selection may be set according to actual needs, which is not limited in the embodiment of the present specification. Based on the selection of the user, after the specified continuously photographed pictures are converted into a video image, the picture annotation is performed, which improves the efficiency of picture annotation, and at the same time has relatively high flexibility. For example, the user may use clearer pictures in a group of continuously photographed pictures as a set of pictures to be annotated.

In some embodiments, before converting multiple pictures in a received set of pictures to be annotated into a video image, the method further includes: determining whether the multiple pictures in the set of pictures to be annotated are a group of continuously photographed pictures, and if so, converting the multiple pictures in the set of pictures to be annotated into a video image.

In an embodiment, after the set of pictures to be annotated is received, it can be determined whether the pictures in the set of pictures to be annotated are a group of continuously photographed pictures. The photographing content of a group of continuously photographed pictures is relatively close, and may have slight differences. Similarities between various pictures may be calculated, if the similarity is greater than a preset value, they are considered as a group of similar pictures. It also can be determined, by viewing photographing content of each picture in the set of pictures to be annotated, and the like, whether the pictures in the set of pictures to be annotated are a group of continuously photographed pictures. Other methods can be used for determination according to actual needs, which is not limited in the embodiment of the present specification. If it is determined that the pictures in the set of pictures to be annotated are a group of continuously photographed pictures, the pictures in the set of pictures to be annotated are converted into a video image, and the pictures are annotated. If it is determined that the pictures in the set of pictures to be annotated are not a group of continuously photographed pictures, the pictures in the set of pictures to be annotated may be annotated by manual annotation, which is not limited in the embodiment of the present specification.

In the embodiment, after pictures that need to be annotated are received, it may be first determined whether the pictures belong to a group of pictures photographed continuously, and if so, the pictures can be converted into a video image, and automatic annotation is performed by using the video to improve the annotation efficiency of continuously photographed pictures.

In step 104, video annotation is performed on the video image to obtain an annotation result.

In an embodiment, after multiple pictures in the set of pictures to be annotated are converted into a video image, video annotation may be performed on the video image. For example, the video image may be annotated by using a video tracking model, a video tracking algorithm, or the like. For example, a license plate number or a specified graph, text, and the like may be defined as a tracking object, and tracking annotation is performed on the video image to obtain an annotation result of the video image. For example, historical data such as multiple groups of annotated pictures may be used in advance to train the video tracking model, after the video tracking model is constructed, the established video tracking model is used to perform video tracking annotation on the pictures in the set of pictures to be annotated uploaded by the user. The video tracking model may track motion information of objects in adjacent video frames, for example, track a specified target in the video in various video frames.

The annotation may be understood as a method of marking the specified content in the picture or video, and the annotation result may be annotation information text such as a table. The annotation result may include information such as location coordinates of the annotation, content of the annotation, and form of the annotation (such as frame selection and bubble), for example, a video frame at which second has an annotation, the location coordinates of the annotation, the content of the annotation, the form of the annotation (such as frame-selection annotation), and the like. Annotation information corresponding to all video frames may be saved as an annotation result.

In some embodiments, the following method may be used to perform video annotation on the video image: acquiring an annotation sample video frame in the video image, using the annotation sample video frame as a video annotation sample, and performing video annotation on another video frame in the video image to obtain the annotation result.

In an embodiment, a marked video frame may be obtained from a video image and regard it as an annotation sample video, that is, the annotation sample video frame can be understood as a video frame with annotation information in the video image, and may be used as a basis and reference for annotation of another frame of video in the video image. A video frame can be understood as a frame of video. The annotation sample video frame may be a frame of video or multiple frames of video, which may be set according to actual needs and is not limited in the embodiment of the present specification. For example, one or more frames of video with annotation information may be acquired from the video image and regarded as an annotation sample video frame. If the annotation sample video frame has multiple frames of video, a common point of annotations of the multiple frames of video may be used as a reference basis to annotate another frame of video. After the annotation sample video frame is acquired, the annotation sample video frame may be used as a video annotation sample, and annotation is performed on another video frame in the video image to obtain the annotation result. For example, a video tracking model, a video tracking algorithm, or the like may be used to annotate another video frame in the video image with reference to the annotation sample video frame.

By acquiring an annotation sample video frame with annotation information in the video as an annotation sample, another video frame in the video is annotated. An annotation result can be quickly obtained based on the video frame, and the video result is finally mapped to the original pictures to obtain annotation results of the original group of pictures. The annotation of multiple pictures is converted to annotation of a picture, and annotation is performed on another video frame, thus improving the efficiency and accuracy of picture annotation.

In step 106, the annotation result is used as an annotation result of each picture in the set of pictures to be annotated according to a correspondence between a video frame in the video image and a picture in the set of pictures to be annotated.

In an embodiment, the video image is obtained by converting the pictures in the set of pictures to be annotated. Each frame of video in the video image has a correspondence with each picture in the set of pictures to be annotated, and the annotation result of the video image may be used as the annotation result of the picture. In some embodiments, according to correspondences between the video image and the pictures in the set of pictures to be annotated, the annotation results corresponding to various video frames in the video image are associated with the pictures in the set of pictures to be annotated. For example, there are 10 frames of video in the video image for annotation, and each frame of video in the 10 frames of video corresponds to an annotation result. According to the correspondences between various frames of video in the video image and various pictures in the set of pictures to be annotated, pictures respectively corresponding to the 10 frames of video are obtained, and annotation results corresponding to the 10 frames of video are associated with the corresponding pictures to complete annotation of the various pictures in the set of pictures to be annotated. For example, if the first frame of video corresponds to picture 1, an annotation result of the first frame of video is associated with picture 1, and so on. At the same time, an association between the picture and the annotation result, as well as content of the annotation result may be stored.

In the embodiment, the annotation result in the set of pictures to be annotated may be similar to the annotation result of the video image, and both can be saved in the form of text, occupy less memory, facilitate management, and can be updated and adjusted at any time. When the annotation of the picture is adjusted, there is no need to regenerate a picture, and only the text of the annotation result needs to be modified. If the storage space is relatively large, the annotation result may also be directly marked at a corresponding location of the picture, and the picture with the annotation result is stored or returned to the user.

In some embodiments, after the associating the annotation result with the corresponding picture, the method further includes: saving each annotation result and an association between the annotation result and a picture; and when an annotated picture display request is received, acquiring a standard result corresponding to a picture in the annotated picture display request according to the association between the picture and the annotation result, and displaying the annotation result at a corresponding location of the corresponding picture.

In an embodiment, after acquiring the association between the annotation result and the picture, the annotation result corresponding to the picture, such as the annotation coordinates location, the annotation content, the annotation form, and the association between the annotation and the picture, may be saved. When a picture display request is received, the annotation result may be displayed at a corresponding location of the corresponding picture according to the annotation result associated with the picture, which is convenient for users to view. For example, when picture 1 is displayed, the annotation result associated with picture 1 may be acquired. According to the annotation result, the annotation is displayed at the annotation coordinates location of the picture according to the annotation form and annotation content recorded in the annotation result, for example, the corresponding text is frame-selected at the corresponding location of the picture. The annotation result and the picture are saved separately, which can reduce the space occupied by the picture. At the same time, when the picture needs to be displayed, the annotation result is displayed in the picture based on the saved correspondence between the annotation result and the picture, which is convenient for users to view.

After video annotation is performed on the video image, the user can also adjust the annotation result according to actual needs, and associate the adjusted annotation result with the corresponding picture. By converting a group of pictures into a video image, another video frame in the video image is automatically annotated based on the annotation sample video frames with an annotation. After the video image annotation is completed, the user only needs to perform slight adjustment on an annotation result that is not accurate enough. There is no need to manually annotate the pictures one by one, thus improving the efficiency and accuracy of picture annotation.

In the picture annotation method provided in the embodiments of the present specification, annotation of multiple continuous pictures is converted into video annotation. After multiple pictures to be annotated are converted into a video, annotation may be performed on the video image by using a video annotation algorithm, and an annotation result can be quickly obtained based on a video frame. Finally, a video result is mapped to original pictures to obtain annotation results of the original group of pictures. The picture annotation is converted to video annotation, and the efficiency and accuracy of picture annotation can be improved by using the continuity of the video.

In some embodiments, the acquiring the annotation sample video frame in the video image may include: acquiring an annotation sample picture in the set of pictures to be annotated; and acquiring a video frame corresponding to the annotation sample picture in the video image as the annotation sample video frame.

Figure 2:
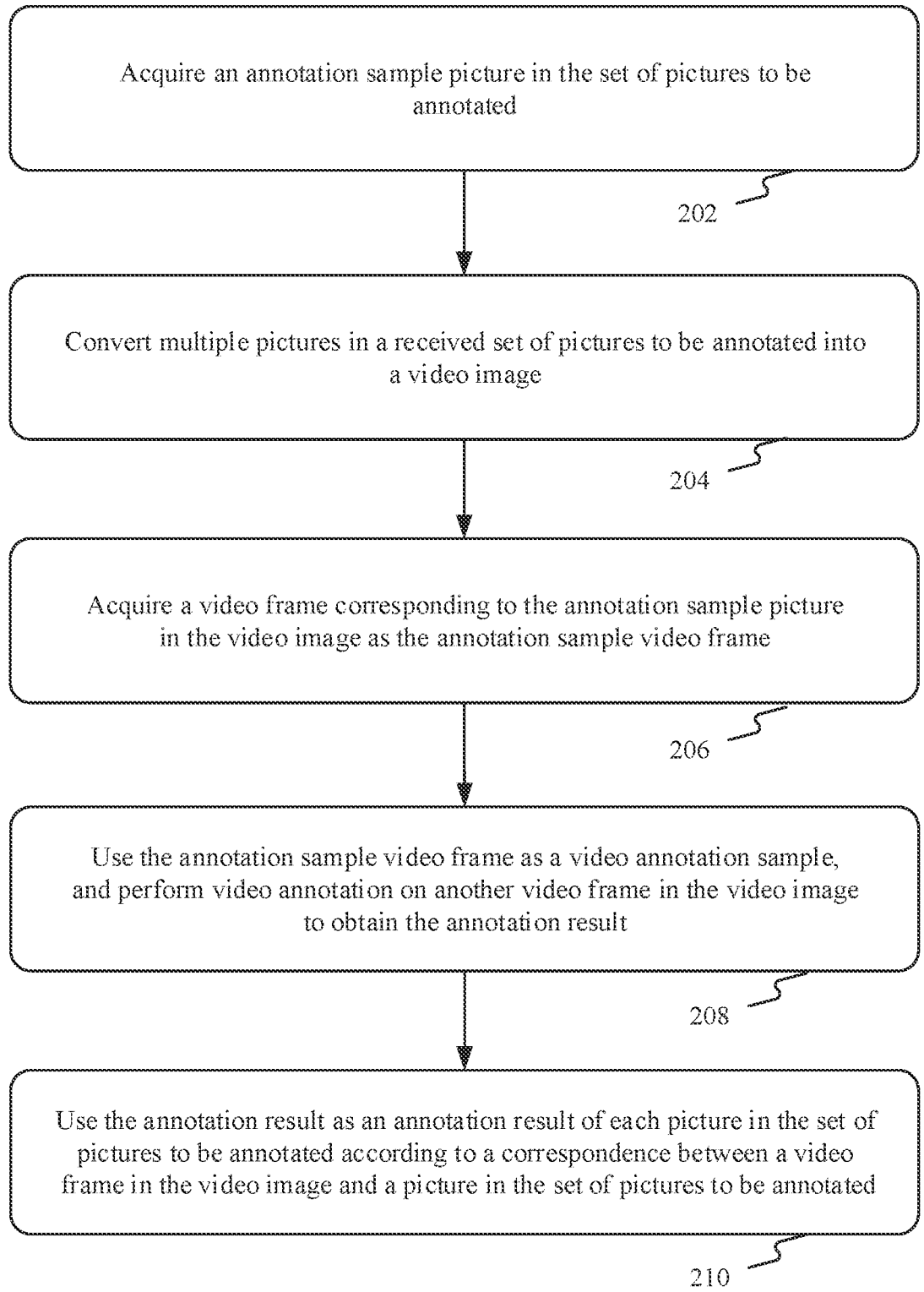
FIG. 2 is a flowchart of a picture annotation method according to an embodiment.

FIG. 2 is a flowchart of a picture annotation method according to an embodiment. As shown in FIG. 2, when a user uploads a set of pictures to be annotated, one of the pictures (such as the first picture) may be manually annotated. In some embodiments, multiple pictures may also be manually annotated. The annotated picture may be used as an annotation sample picture (202). After multiple pictures in the set of pictures to be annotated are converted into a video image (204), a video frame corresponding to the annotated picture also carries annotation information, and a frame of video corresponding to the annotation sample picture in the video image may be obtained as an annotation sample video frame (206). The annotation sample video frame is used as an annotation sample to automatically annotate another frame of video in the video image (208). The annotation result is used as an annotation result of each picture in the set of pictures to be annotated according to a correspondence between a video frame in the video image and a picture in the set of pictures to be annotated (210).

The user may freely select one picture in a group of pictures for annotation, and annotation content may also be set according to actual needs. Based on the picture annotated by the user, various video frames in the video image after conversion are automatically annotated to ensure the flexibility of picture annotation. Moreover, the user only needs to manually annotate one picture to realize automatic annotation of a group of pictures, thus improving the efficiency and accuracy of video annotation.

In some embodiments, the acquiring the annotation sample video frame in the video image includes: after converting the pictures in the set of pictures to be annotated into the video image, receiving a video annotation request, and annotating a specified video frame in the video image; and acquiring the annotated specified video frame as the annotation sample video frame.

Figure 3:
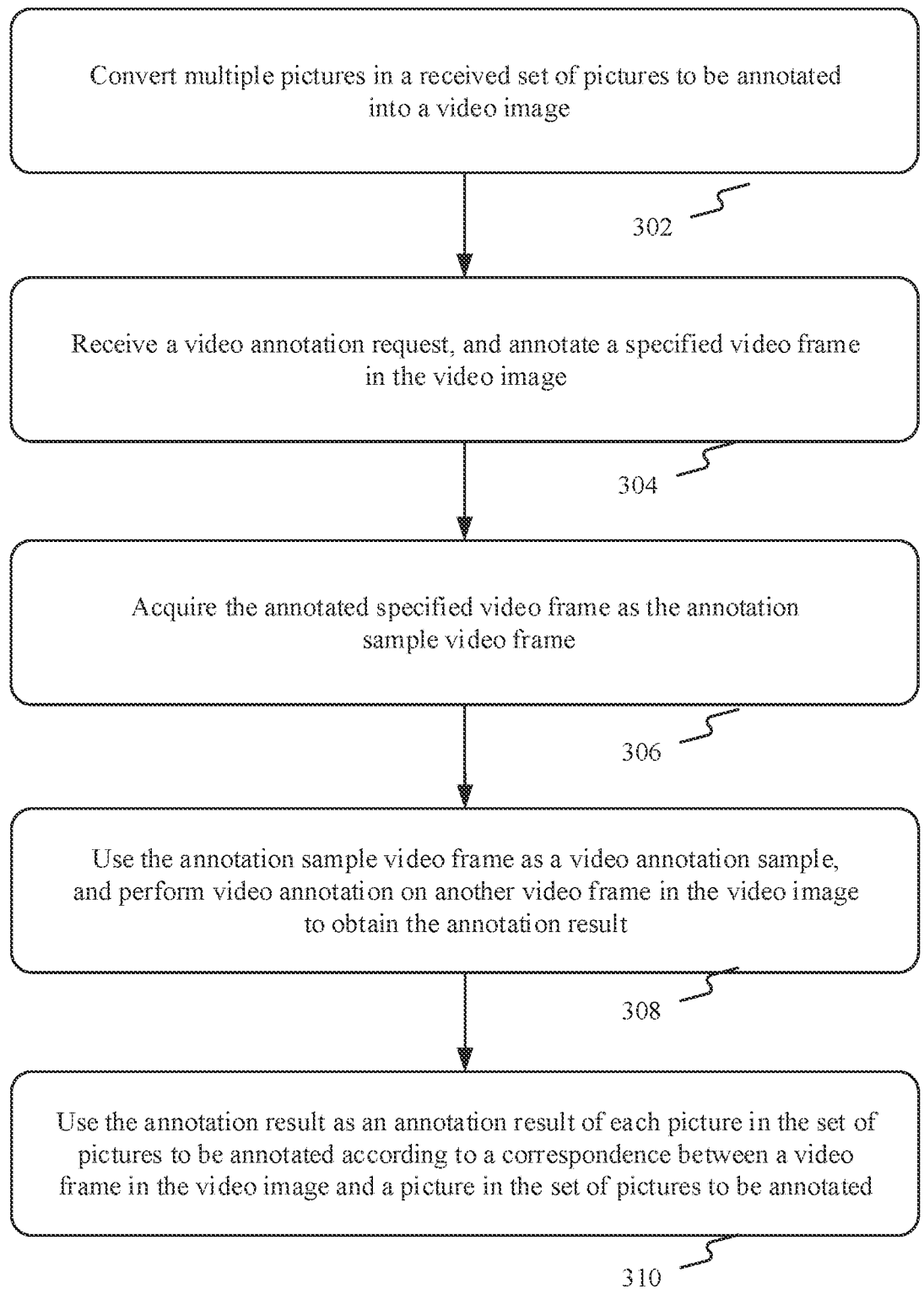
FIG. 3 is a flowchart of a picture annotation method according to an embodiment.

FIG. 3 is a flowchart of a picture annotation method according to an embodiment. As shown in FIG. 3, multiple pictures in a received set of pictures to be annotated are converted into a video image (302). A video annotation request is received, and a specified video frame in the video image is annotated (304). The annotated specified video frame is acquired as the annotation sample video frame (306). The annotation sample video frame is used as a video annotation sample to perform video annotation on another video frame in the video image to obtain the annotation result (308). The annotation result is used as an annotation result of each picture in the set of pictures to be annotated according to a correspondence between a video frame in the video image and a picture in the set of pictures to be annotated (310).

In the embodiment, after a set of pictures to be annotated uploaded by the user is converted into the video image, the user may annotate a certain frame of video in the video image. For example, the user selects a specified video frame in the video image (such as the frame of video at the very beginning of the video or a video frame at the 2nd second) for annotation, and the content, form, location, and the like of the annotation may be defined. The specified video frame annotated by the user is used as an annotation sample video frame, and the annotation sample video frame is used as an annotation sample to perform automatic annotation on another video frame in the video image. The user may freely select any frame of video in a video image after the conversion for annotation, and annotation content may also be set according to actual needs. Based on the video frame annotated by the user, various video frames in the video image after the conversion are automatically annotated to ensure the flexibility of picture annotation, thus improving the efficiency and accuracy of video annotation.

In some embodiments, the using the annotation sample video frame as a video annotation sample, and performing video annotation on another video frame in the video image includes: acquiring an annotation object in the annotation sample video frame, and using the annotation object as a tracking target; and according to the tracking target, acquiring the tracking target from another video frame in the video image, and generating an annotation at a location of the tracking target.

In an embodiment, when another video frame in the video image is annotated based on the annotation sample video frame, an annotation object in the annotation sample video frame may be obtained. The annotation object may include the annotation location, the annotation target (such as a text and an object), and the like, such as annotated text content, annotated image content, or annotated location. The annotation object in the annotation sample video frame is used as a tracking target, a video frame with the tracking target is acquired from other video frames in the video image, and an annotation is generated at a location of the tracking target in the video frame with the tracking target. For example, with reference to specific information of the annotation in the annotation sample video frame, the corresponding annotation content, annotation form, and the like are generated. For example, if an annotation object in the annotation sample video frame is a cat, annotation is performed by frame selection, and an annotation object with a cat is frame-selected in another video frame.

In the embodiments of the present specification, tracking annotation may be performed automatically on other video frames in the video image using the video tracking method based on the annotation sample video frame that has been marked, thereby improving the efficiency and accuracy of picture annotation.

In some embodiments, the using the annotation sample video frame as a video annotation sample, and performing video annotation on another video frame in the video image includes: annotating an adjacent video frame of the annotation sample video frame by using an optical flow method, using the annotated video frame as a new annotation sample video frame, and annotating an adjacent video frame of the new annotation sample video frame until annotation of the video image is completed.

In an embodiment, when other video frames in the video image are annotated by using the annotation sample video frame, an adjacent video frame of the annotation sample video frame in the video image may be annotated by using the optical flow method. After annotation of the adjacent video frame is completed, the annotated adjacent video frame is used as a sample to annotate a video frame adjacent to the adjacent video frame, and so on, until all video frames of the video image are annotated. The optical flow method uses changes of pixels in a time domain in an image sequence and correlation between adjacent frames to find a correspondence between the previous frame and the current frame, thereby calculating motion information of an object between adjacent frames. Based on the annotation sample video frame, the optical flow method can be used to quickly and automatically complete the annotation of adjacent videos, thus realizing the automatic annotation of the video, and improving the efficiency and accuracy of the picture annotation.

In some embodiments, the associating the annotation result with the corresponding picture according to the correspondence between the video frame in the video image and the picture in the set of pictures to be annotated includes: splitting the annotated video image; acquiring an annotation result of a video frame corresponding to each picture from the annotation result of the video image according to a correspondence between a video frame in the split video image and each picture in the set of pictures to be annotated; and associating the annotation result of the video frame corresponding to each picture with the corresponding picture.

In an embodiment, after the video image is annotated, the annotated video image may be split. For example, each frame of video with the annotation result is split out according to the annotation result. Because the video image is obtained by conversion based on the pictures in the set of pictures to be annotated, each picture has a correspondence with the video frame in the video image, for example, each picture corresponds to a video frame at which second of the video image. According to a correspondence between a video frame in the video image and each picture in the set of pictures annotated, an annotation result of a video frame corresponding to each picture is acquired from the annotation result of the video image. For example, the video image is split into a frame-by-frame video, picture 1 corresponds to a video frame at the 0.1st second in the video image, then an annotation result corresponding to the video frame at the 0.1st second is acquired, and the annotation result is associated with picture 1. Picture 2 corresponds to a video frame at the 0.2nd second in the video image, then an annotation result corresponding to the video frame at the 0.2nd second is acquired, and the annotation result is associated with picture 2, and so on.

In the embodiments of the present specification, after pictures are converted into a video, annotation is performed based on the video. After the video annotation is completed, the annotation result is associated with the corresponding picture based on the correspondence between the picture and the video, thus obtaining the annotation result of each picture. The workload of annotating multiple pictures is converted into annotating one picture and then performing automatic annotation by using a video, which reduces the workload of picture annotation and improves the efficiency and accuracy of picture annotation.

Figure 4:
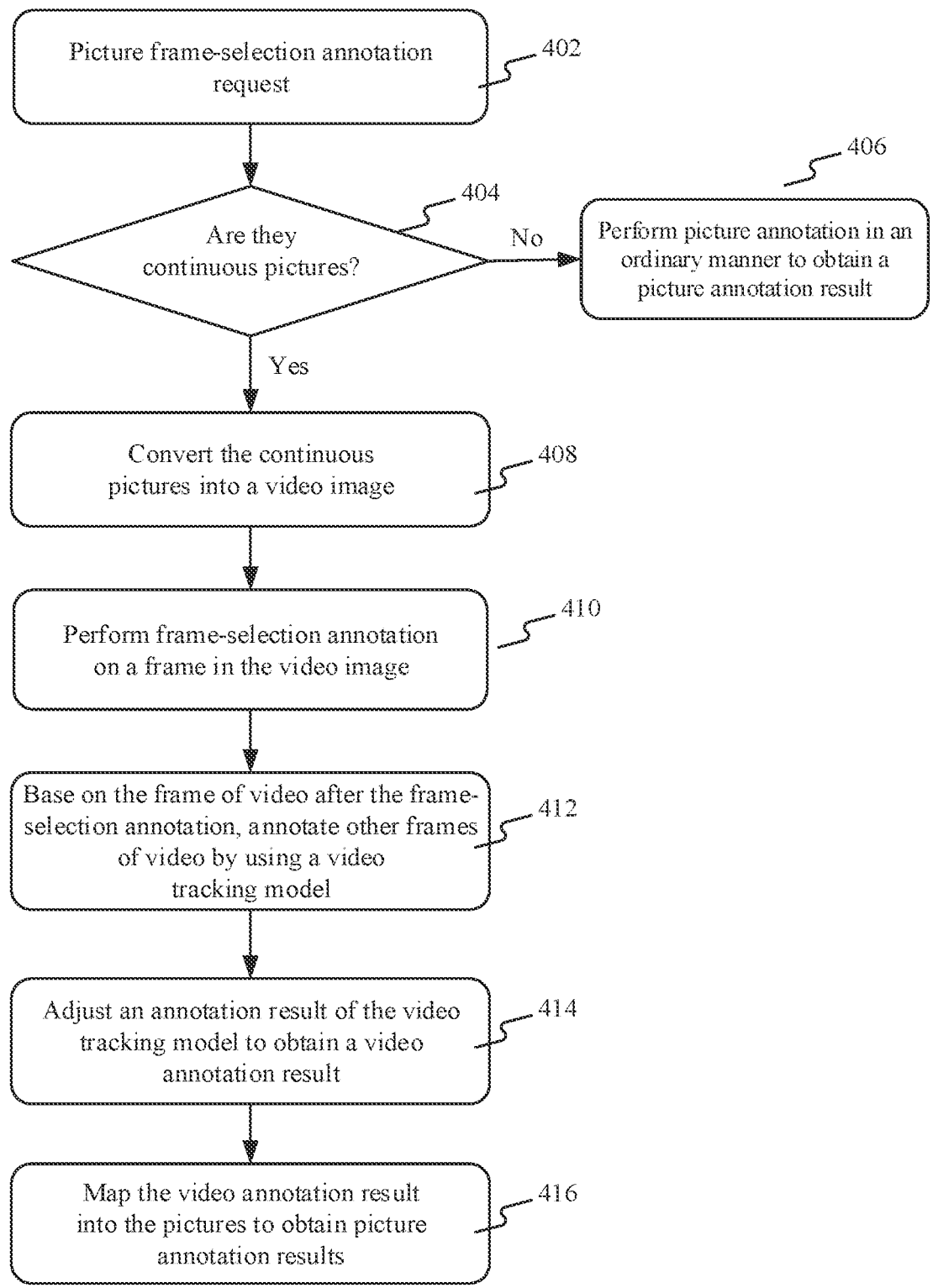
FIG. 4 is a flowchart of a picture frame-selection annotation method according to an embodiment.

FIG. 4 is a flowchart of a picture frame-selection annotation method according to an embodiment. The picture frame-selection annotation may be understood as a form of picture annotation for performing frame-selection on part of the content of a picture, for example, performing frame-selection on multiple text parts in a certificate picture. The method may include the following steps.

In step 402, a request for picture frame-selection annotation is received. For example, picture frame-selection annotation needs to be performed on pictures of a business user.

In step 404, it is determined whether the pictures that need to be annotated are continuous pictures. For example, determination can be made by picture similarity calculation and other methods. If the pictures that need to be annotated are not a series of continuous pictures, an ordinary annotation method, such as manual annotation, is used to perform annotation to obtain an annotation result in step 406.

In step 408, if the pictures that need to be annotated are a series of continuous pictures, the picture annotation apparatus may be used to convert the series of pictures into a video for annotation. An annotation object viewed by the user during annotation is the video.

In step 410, frame-selection annotation is performed by the user on a frame in the video. As content of an adjacent frame of the video has a certain continuity, the picture annotation apparatus may use an integrated video tracking model (e.g., tracking using an optical flow method) to automatically annotate other frames in the video in step 412. The user may slightly adjust results of the automatic annotation to complete the annotation of the entire video in step 414, which greatly improves the efficiency and accuracy of the annotation.

After the video annotation is completed, the annotation apparatus may automatically split the annotation result of the video. According to correspondences between video frames and the original pictures, the annotation result of each frame of the video is mapped to the original picture in step 416, so as to obtain the annotation results of the original pictures and return them to the user.

For example, after the PIC(x) group of continuous pictures in the original annotation pictures are correspondingly converted into the VIDEO(x) video, continuous pictures m to n in the PIC(x) group and frames 1 to (n-m+1) in the VIDEO(x) video are in one-to-one correspondence. After the completion of video annotation of the VIDEO(x), a result list VIDEO(x).videoResultList is obtained, which includes frame-selection annotation results of various frames: VIDEO(x).framResult[1] to VIDEO(x).framResult[n-m+1]. According to the one-to-one correspondence between the PIC(x) picture and the VIDEO(x) video frame, the annotation result of the video may be slightly different from the annotation result of the picture. The annotation results VIDEO(x).framResult[1] to VIDEO(x).framResult[n-m+1] may be converted to the picture annotation results of the pictures PIC(x).m→PIC(x).n according to a picture annotation result format, which are the picture annotation results.

The embodiments of the present specification provide a picture annotation method, which converts a group of continuous pictures into a video, uses the continuity between various frames of the video, and uses a related model for analysis (such as optical flow tracking of the video). After a user annotates one of the frames of the video, the frame-selection annotation of its adjacent frame may be performed automatically, and the procedure continues based on the annotation result of the adjacent frame until the frame selection of the entire video is completed. For the automatically annotated frames of the model analysis, the user may slightly adjust the annotation results to complete the video annotation. After the video annotation is completed, the annotation apparatus may analyze the video annotation results and map the result of each frame to each original picture, so that the annotation results of the original group of pictures can be obtained. By using this method, the annotation efficiency and annotation accuracy can be greatly improved, and the desired annotation results can be quickly obtained.

Corresponding to the above picture annotation method, a picture annotation apparatus is further provided in embodiments of the present specification. Each module in the picture annotation apparatus may be implemented by software, or hardware, or a combination of software and hardware.

Figure 5:
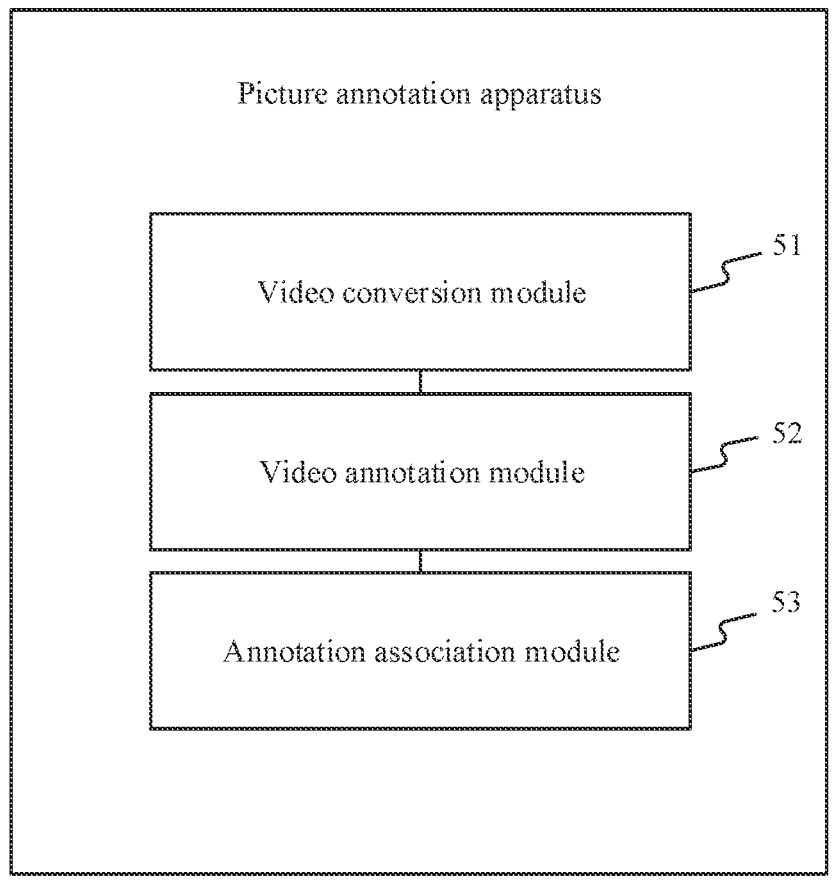
FIG. 5 is a schematic diagram of a picture annotation apparatus according to an embodiment.

FIG. 5 is a schematic diagram of a picture annotation apparatus according to an embodiment. The apparatus may operate as a device management platform. As shown in FIG. 5, the picture annotation apparatus may include: a video conversion module 51 configured to convert multiple pictures in a received set of pictures to be annotated into a video image; a video annotation module 52 configured to perform video annotation on the video image to obtain an annotation result; and an annotation association module 53 configured to associate the annotation result with the corresponding picture according to a correspondence between a video frame in the video image and a picture in the set of pictures to be annotated.

In the embodiment, annotation of multiple continuous pictures is converted into video annotation. After multiple pictures to be annotated are converted into a video, annotation may be performed on the video by using a video annotation algorithm, and an annotation result can be quickly obtained based on a video frame. Finally, a video result is mapped to original pictures to obtain annotation results of the original group of pictures. The picture annotation is converted to video annotation, and the efficiency and accuracy of picture annotation can be improved by using the continuity of the video.

In some embodiments, the video annotation module 52 is configured to acquire an annotation sample video frame in the video image, use the annotation sample video frame as a video annotation sample, and perform video annotation on another video frame in the video image to obtain the annotation result.

In the embodiments of the present specification, by acquiring an annotation sample video frame with annotation information in the video as an annotation sample, another video frame in the video is annotated. An annotation result can be quickly obtained based on the video frame, and the video result is finally mapped to the original pictures to obtain annotation results of the original group of pictures. The annotation of multiple pictures is converted to annotation of a picture, and annotation is performed on another video frame, thus improving the efficiency and accuracy of picture annotation.

In some embodiments, the video annotation module 52 is configured to: acquire an annotation sample picture in the set of pictures to be annotated; and acquire a video frame corresponding to the annotation sample picture in the video image as the annotation sample video frame.

In the picture annotation apparatus provided in the embodiments of the present specification, the user may freely select one picture in a group of pictures for annotation, and annotation content may also be set according to actual needs. Based on the picture annotated by the user, various video frames in the video image after conversion are automatically annotated to ensure the flexibility of picture annotation, thus improving the efficiency and accuracy of video annotation.

In some embodiments, the video annotation module 52 is configured to: after the video conversion module converts the pictures in the set of pictures to be annotated into the video image, receive a video annotation request, and annotate a specified video frame in the video image; and acquire the annotated specified video frame and regard it as the annotation sample video frame.

In the picture annotation apparatus provided in the embodiment of the present specification, the user may freely select any frame of video in a video image after the conversion for annotation, and annotation content may also be set according to actual needs. Based on the video frame annotated by the user, various video frames in the video image after the conversion are automatically annotated to ensure the flexibility of picture annotation, thus improving the efficiency and accuracy of video annotation.

In some embodiments, the video annotation module 52 is configured to: acquire an annotation object in the annotation sample video frame, and use the annotation object as a tracking target; and according to the tracking target, acquire the tracking target from another video frame in the video image, and generate an annotation at a location of the tracking target.

In the picture annotation apparatus provided in the embodiments of the present specification, tracking annotation may be performed automatically on other video frames in the video image using the video tracking method based on the annotation sample video frame that has been marked, thereby improving the efficiency and accuracy of picture annotation.

In some embodiments, the video annotation module 52 is configured to: annotate an adjacent video frame of the annotation sample video frame by using an optical flow method, use the annotated video frame as a new annotation sample video frame, and annotate an adjacent video frame of the new annotation sample video frame until annotation of the video image is completed.

In the picture annotation apparatus provided in the embodiments of the present specification, based on the annotation sample video frame, the optical flow method can be used to quickly and automatically complete the annotation of adjacent videos, thus realizing the automatic annotation of the video, and improving the efficiency and accuracy of the picture annotation.

In some embodiments, the annotation association module 53 is configured to: split the annotated video image; acquire an annotation result of a video frame corresponding to each picture from the annotation result of the video image according to a correspondence between a video frame in the split video image and each picture in the set of pictures to be annotated; and associate the annotation result of the video frame corresponding to the picture with the picture.

In the picture annotation apparatus provided in the embodiments of the present specification, after pictures are converted into a video, annotation is performed based on the video. After the video annotation is completed, the annotation result is associated with the corresponding picture based on the correspondence between the picture and the video, thus obtaining the annotation result of each picture. The workload of annotating multiple pictures is converted into annotating one picture and then performing automatic annotation by using a video, which reduces the workload of picture annotation and improves the efficiency and accuracy of picture annotation.

Figure 6:
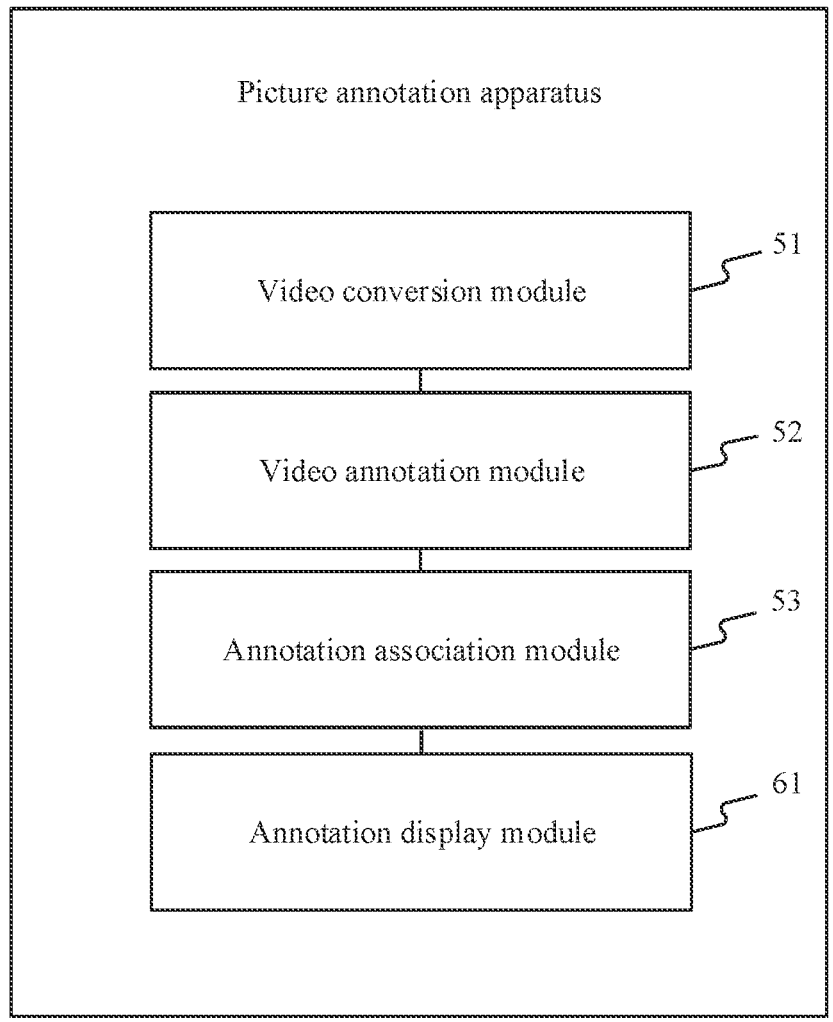
FIG. 6 is a schematic diagram of a picture annotation apparatus according to an embodiment.

FIG. 6 is a schematic diagram of a picture annotation apparatus according to an embodiment. As shown in FIG. 6, the apparatus further includes an annotation display module 61 configured to: save each annotation result and an association between the annotation result and a picture; and when an annotated picture display request is received, acquire a standard result corresponding to a picture in the annotated picture display request according to the association between the picture and the annotation result, and display the annotation result at a corresponding location of the corresponding picture.

In the picture annotation apparatus provided in the embodiments of the present specification, the annotation result and the picture are saved separately, which can reduce the space occupied by the picture. At the same time, when the picture needs to be displayed, the annotation result is displayed in the picture based on the saved correspondence between the annotation result and the picture, which is convenient for users to view.

Figure 7:
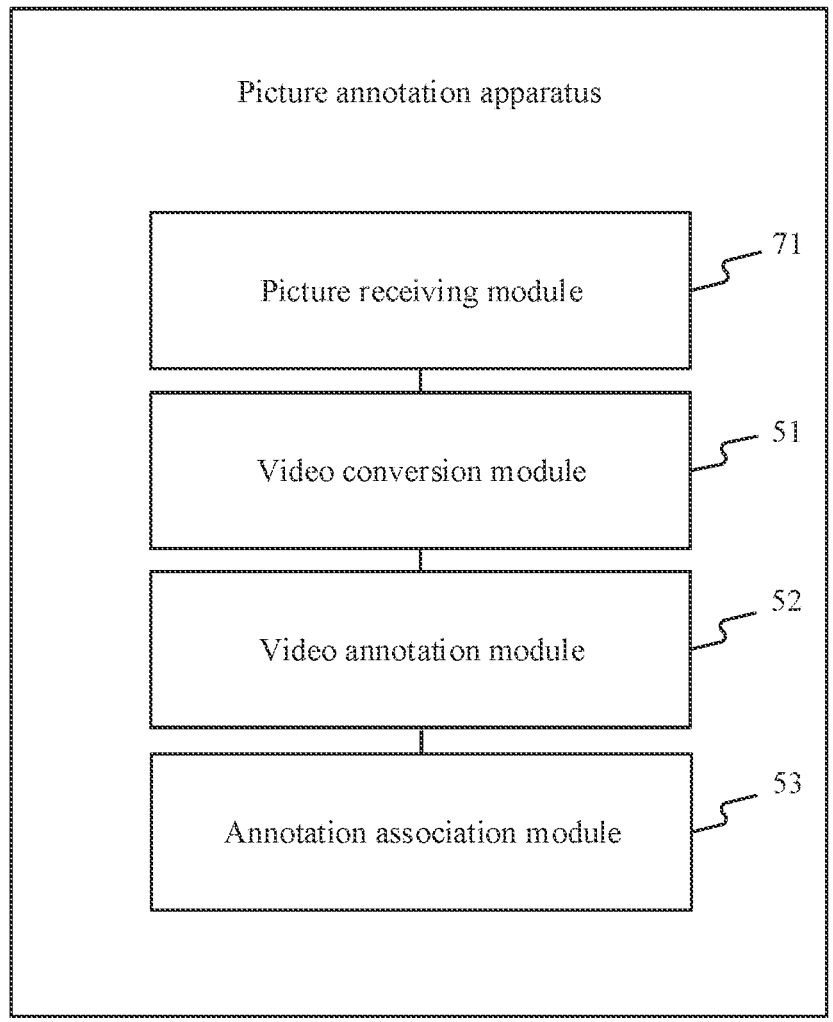
FIG. 7 is a schematic diagram of a picture annotation apparatus according to an embodiment.

FIG. 7 is a schematic diagram of a picture annotation apparatus according to an embodiment. As shown in FIG. 7, the apparatus further includes a picture receiving module 71 configured to: receive a set of pictures to be processed, wherein the set of pictures to be processed includes at least one group of multiple pictures obtained by continuous photographing; and receive a picture annotation request, wherein the picture annotation request includes the set of pictures to be annotated, and the set of pictures to be annotated is a group of continuously photographed multiple pictures in the set of pictures to be processed.

In the picture annotation apparatus provided in the embodiments of the present specification, based on the selection of the user, after the specified continuously photographed pictures are converted into a video image, the picture annotation is performed, which improves the efficiency of picture annotation, and at the same time has relatively high flexibility. For example, the user may use clearer pictures in a group of continuously photographed pictures as a set of pictures to be annotated.

In some embodiments, the video conversion module 51 is further configured to: determine whether the multiple pictures in the set of pictures to be annotated are a group of continuously photographed pictures, and if so, convert the multiple pictures in the set of pictures to be annotated into a video image.

In the picture annotation apparatus provided in the embodiments of the present specification, a group of pictures photographed continuously is annotated. After pictures that need to be annotated are received, it may be first determined whether the pictures belong to a group of pictures photographed continuously, and if so, the pictures can be converted into a video image, and automatic annotation is performed by using the video to improve the annotation efficiency of continuously photographed pictures.

The above apparatus embodiments correspond to the method embodiments. For a specific implementation, reference may be made to the description of the above corresponding method embodiments.

A picture annotation data processing device is further provided in embodiments of the present specification. The device may include: at least one processor and a memory for storing processor-executable instructions which, when executed by the processor, perform the picture annotation method described above including, for example, converting multiple pictures in a received set of pictures to be annotated into a video image; performing video annotation on the video image to obtain an annotation result; and associating the annotation result with the corresponding picture according to a correspondence between a video frame in the video image and a picture in the set of pictures to be annotated.

A picture annotation system is further provided in embodiments of the present specification. The system may include: at least one processor and a memory for storing processor-executable instructions which, when executed by the processor, implement the picture annotation method described above including, for example, converting multiple pictures in a received set of pictures to be annotated into a video image; performing video annotation on the video image to obtain an annotation result; and associating the annotation result with the corresponding picture according to a correspondence between a video frame in the video image and a picture in the set of pictures to be annotated.

The apparatus, device, and system provided in the present specification may be used in a variety of data analysis and processing systems. The apparatus, device, and system may be a separate server, or may include a server cluster, a system (including a distributed system), software (an application), an actual operating device, a logic gate circuit device, a quantum computer, etc.

Figure 8:
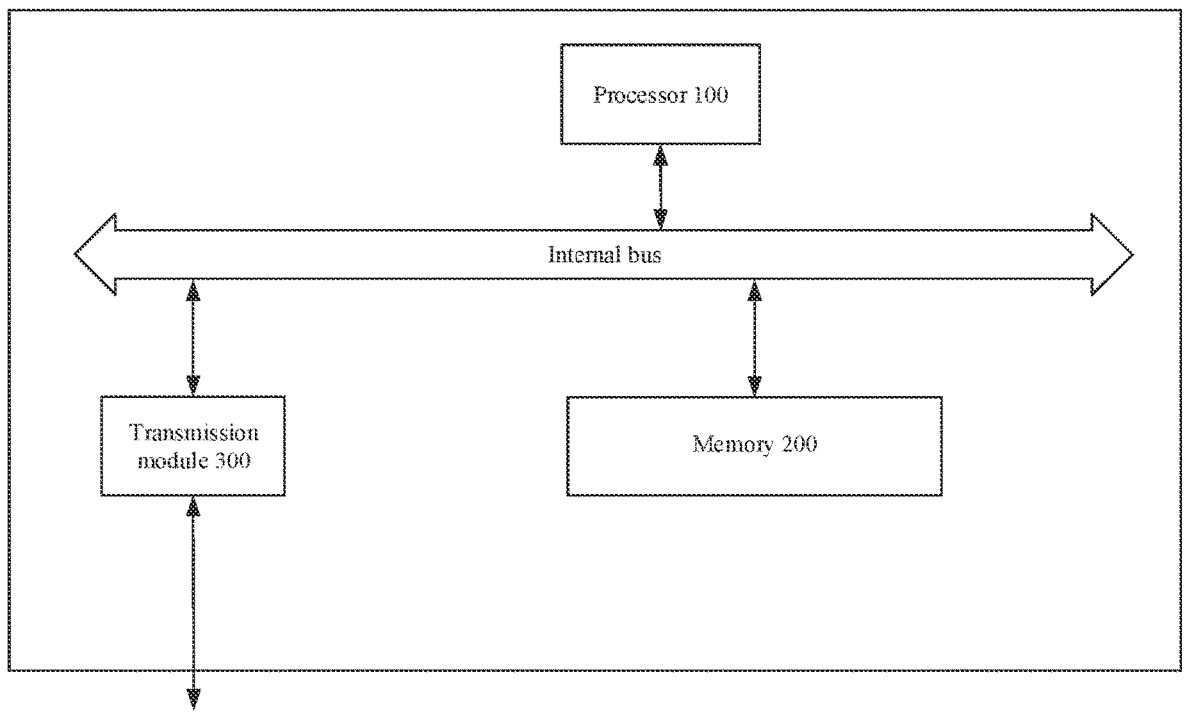
FIG. 8 is a schematic diagram of a picture annotation device according to an embodiment.

FIG. 8 is a schematic diagram of a picture annotation device according to an embodiment. The picture annotation device may be a computer terminal or server. As shown in FIG. 8, the picture annotation device may include at least one processor 100 (such as a microprocessor (MCU) or a programmable logic device (FPGA)), a memory 200 for storing data and instructions executable by the processor 100, and a transmission module 300 for communication functions. Those of ordinary skill in the art may understand that the structure shown in FIG. 8 is merely illustrative, which does not limit the structure of the picture annotation device. For example, the picture annotation device may also include more or fewer components than those shown in FIG. 8. For example, the picture annotation device may also include other processing hardware, such as a database or a multi-level cache, a GPU, or may have a configuration different from that shown in FIG. 8.

The non-volatile memory 200 is configured to store software programs and modules of application software, such as program instructions/modules corresponding to the picture annotation method, and the processor 100 performs various functional applications and resource data updating by running the software programs and modules stored in the memory 200. The memory 200 may include a high-speed random access memory, and may also include a non-volatile memory, such as one or more magnetic storage apparatuses, a flash memory, or another non-volatile solid-state memory. In some embodiments, the memory 200 may further include memories remotely arranged with respect to the processor 100, and these remote memories may be connected to a computer terminal through a network. Examples of the above network include, but are not limited to, the Internet, an intranet, a local area network, a mobile communication network, and a combination thereof.

The transmission module 300 is configured to receive or send data via a network. Examples of the above network may include a wireless network provided by a communication provider of the computer terminal. For example, the transmission module 300 includes a Network Interface Controller (NIC), which can be connected to other network devices through a base station so as to communicate with the Internet. As another example, the transmission module 300 may be a Radio Frequency (RF) module, which is configured to communicate with the Internet in a wireless manner.

The methods described above can be implemented through a computer program stored on a storage medium. The storage medium can be read and executed by a computer to perform, for example: converting multiple pictures in a received set of pictures to be annotated into a video image; acquiring an annotation sample video frame from the video image; annotating another video frame in the video image by using the annotation sample video frame as an annotation sample to obtain an annotation result; and associating the annotation result with the corresponding picture according to a correspondence between the video image and a picture in the set of pictures to be annotated.

The storage medium may include a physical apparatus for storing information, which usually digitizes the information and then stores the same in a medium in an electrical, magnetic, or optical manner. The storage medium may include: an apparatus that stores information by means of electrical energy, such as various types of memories, for example, a RAM and a ROM; an apparatus that stores information by means of magnetic energy, such as a hard disk, a floppy disk, a magnetic tape, a magnetic core memory, a bubble memory, and a USB disk; and an apparatus that stores information by optical means, such as a CD or a DVD. Of course, there are other forms of readable storage media, such as a quantum memory and a graphene memory.

The above picture annotation method can be implemented by a processor executing corresponding program instructions in a computer, such as being implemented at a PC terminal by using the c++ language of the windows operating system, being implemented in a linux system, or in other manners, for example, being implemented at a smart terminal by using the programming languages of the android and iOS systems, being implemented based on the processing logic of a quantum computer, etc.

The embodiments of the present specification are not limited to the situations that must comply with industry communication standards, standard computer data processing and data storage rules, or the situations described in one or more embodiments of the present specification. Some industry standards, or implementation solutions obtained through slight modifications in a customized manner or based on implementations described in the embodiments can also achieve the same, equivalent, or similar implementation effects of the above embodiments, or predictable implementation effects after variations. Embodiments acquired by applying these modified or deformed data acquisition, storage, determination, processing manners, etc. can still fall within the scope of optional implementation solutions of the embodiments in the present specification.

With the development of technologies, nowadays, the improvement to many method flows can be implemented as a direct improvement to a hardware circuit structure. Designers program improved method flows into hardware circuits to obtain corresponding hardware circuit structures. For example, a Programmable Logic Device (PLD) (e.g., a Field Programmable Gate Array (FPGA)) is such an integrated circuit, of which the logic function is determined by a user through programming the device. Designers "integrate" a digital system onto a piece of PLD by independent programming without asking a chip manufacturer to design and manufacture a dedicated integrated circuit chip. Moreover, at present, instead of manually making an integrated circuit chip, this programming is also implemented mostly using "logic compiler" software, which is similar to a software compiler used for program development and compilation. However, the original code before compilation also has to be compiled using a specific programming language, which is known as a Hardware Description Language (HDL). There is not only one, but many kinds of HDLs, such as ABEL (Advanced Boolean Expression language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language). At present, VHDL (Very-High-Speed Integrated Circuit Hardware Description Language) and Verilog are the most commonly used. Those skilled in the art should also know that a hardware circuit for implementing a logic method flow can be easily obtained by slightly logically programming the method flow using the above several hardware description languages and programming it into an integrated circuit.

In some embodiments, a controller may be used to implement the above methods. For example, the controller may be in the form of a microprocessor or processor and a computer-readable medium storing computer-readable program code (such as software or firmware) executable by this (micro)processor, a logic gate, a switch, an Application Specific Integrated Circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. A controller of a memory may also be implemented as part of the control logic of the memory. Those skilled in the art also know that, in addition to implementing a controller in the form of pure computer-readable program code, the method steps can be logically programmed to enable the controller to realize the same function in the form of logic gates, switches, special integrated circuits, programmable logic controllers, embedded microcontrollers, or the like. Therefore, such a controller can be regarded as a hardware component, and the devices included therein for realizing various functions can also be regarded as the structure within the hardware component. Alternatively, the devices for realizing various functions can even be regarded as both a software module for implementing a method and a structure within a hardware component.

The systems, devices, modules, or devices explained in the above embodiments may be implemented by a computer chip or entity, or by a product with a certain function. An example implementation apparatus is a computer. The computer may be, for example, a personal computer, a laptop computer, an on-board human-machine interaction device, a cellular phone, a camera phone, a smart phone, a personal digital assistant, a media player, a navigation device, an email device, a game console, a tablet computer, a wearable device, or a combination of any of these devices.

The embodiments are described with reference to flowcharts and/or block diagrams. It should be understood that each flow and/or block in the flowcharts and/or block diagrams and a combination of flows and/or blocks in the flowcharts and/or block diagrams may be implemented by computer program instructions. These computer program instructions can be provided to a processor of a general-purpose computer, a special-purpose computer, an embedded processor, or a further programmable resource data updating device to produce a machine, so that the instructions executed by the processor of the computer or further programmable resource data updating device produce an apparatus for realizing the functions specified in one or more flows of the flowcharts and/or one or more blocks of the block diagrams.

These computer program instructions may also be stored in a computer-readable medium that can direct a computer or a further programmable resource data updating device to work in a specific manner, so that the instructions stored in this computer-readable medium produce an article of manufacture including an instruction apparatus which implements the functions specified in one or more flows of the flowcharts and/or one or more blocks of the block diagrams.

These computer program instructions can also be loaded onto a computer or a further programmable resource data updating device, so that a series of operation steps are performed on the computer or another programmable device to produce computer-implemented processing, so that the instructions executed on the computer or another programmable device provide steps for implementing the functions specified in one or more flows of the flowcharts and/or one or more blocks of the block diagrams.

The computer-readable medium includes permanent and non-permanent, removable and non-removable media, and can store information by any method or technology. The information may be computer-readable instructions, data structures, program modules, or other data. Examples of a storage medium of a computer include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, read-only compact disc read-only memory (CD-ROM), digital versatile disc (DVD) or other optical storage, magnetic tape cassettes, magnetic tape magnetic disk storage, graphene storage, or other magnetic storage devices, or any other non-transmission medium, and can be used to store information that can be accessed by computing devices. As defined herein, the computer-readable medium does not include temporary computer-readable media (transitory media), such as a modulated data signal and a carrier.

One or more embodiments of the present specification may be implemented using computer-executable instructions executed by a computer, such as a program module. Generally, the program module includes a routine, a program, an object, an assembly, a data structure, and the like used for executing a specific task or implementing a specific abstract data type. One or more embodiments of the present specification may also be practiced in distributed computing environments in which tasks are performed by remote devices connected through a communication network. In the distributed computing environments, the program module may be located in local and remote computer storage media including a storage device.

The above description is only example embodiments of the present specification and is not intended to limit the present specification. For those skilled in the art, various modifications and changes can be made to the embodiments of the present specification. Any modifications, equivalent replacements, improvements, etc. made within the spirit and principle of the present specification shall be included in the scope of the claims.

The invention claimed is:

1. A picture annotation method, comprising:
converting, into a video image, multiple pictures in a set of pictures to be annotated;
performing video annotation on the video image to obtain an annotation result of the video image; and
using the annotation result of the video image as an annotation result of each picture in the set of pictures to be annotated according to a correspondence between a video frame in the video image and a picture in the set of pictures to be annotated,
wherein the using the annotation result of the video image comprises:
splitting the video image into multiple frames corresponding to the set of pictures, after the video annotation is performed on the video image;
acquiring an annotation result of a video frame corresponding to each picture from the annotation result of the video image according to a correspondence between a video frame in the split video image and each picture in the set of pictures to be annotated; and
associating the annotation result of the video frame corresponding to each picture with the corresponding picture.

2. The method of claim 1, wherein the performing video annotation on the video image comprises:
acquiring an annotation sample video frame in the video image; and
using the annotation sample video frame as a video annotation sample to perform video annotation on another video frame in the video image, to obtain the annotation result of the video image.

3. The method of claim 2, wherein the acquiring the annotation sample video frame in the video image comprises:
acquiring an annotation sample picture in the set of pictures to be annotated; and
acquiring a video frame corresponding to the annotation sample picture in the video image as the annotation sample video frame.

4. The method of claim 2, wherein the acquiring the annotation sample video frame in the video image comprises:
after converting the pictures in the set of pictures to be annotated into the video image, receiving a video annotation request, and annotating a specified video frame in the video image; and acquiring the annotated specified video frame as the annotation sample video frame.

5. The method of claim 2, wherein the using the annotation sample video frame as the video annotation sample to perform video annotation on another video frame in the video image comprises:

acquiring an annotation object in the annotation sample video frame as a tracking target; and acquiring the tracking target from another video frame in the video image, and generating an annotation at a location of the tracking target.

6. The method of claim 2, wherein the using the annotation sample video frame as the video annotation sample to perform video annotation on another video frame in the video image comprises:

annotating an adjacent video frame of the annotation sample video frame by using an optical flow method; and using the annotated video frame as a new annotation sample video frame to annotate an adjacent video frame of the new annotation sample video frame, until annotation of the video image is completed.

7. The method of claim 1, wherein before converting multiple pictures in the set of pictures to be annotated into the video image, the method further comprises:

receiving a set of pictures to be processed, wherein the set of pictures to be processed comprises at least one group of multiple pictures obtained by continuous photographing; and receiving a picture annotation request, wherein the picture annotation request comprises the set of pictures to be annotated, and the set of pictures to be annotated is a group of continuously photographed multiple pictures in the set of pictures to be processed.

8. The method of claim 1, wherein before converting multiple pictures in the set of pictures to be annotated into the video image, the method further comprises:

determining whether the multiple pictures in the set of pictures to be annotated are a group of continuously photographed pictures, and if so, converting the multiple pictures in the set of pictures to be annotated into the video image.

9. The method of claim 1, wherein after the associating the annotation result with the corresponding picture, the method further comprises:

saving each annotation result and an association between the annotation result and a picture; and when an annotated picture display request is received, acquiring a standard result corresponding to a picture in the annotated picture display request according to the association between the picture and the annotation result, and displaying the annotation result at a corresponding location of the corresponding picture.

10. A picture annotation device, comprising:
a processor; and
a memory storing instructions executable by the processor,
wherein the processor is configured to:
convert, into a video image, multiple pictures in a set of pictures to be annotated;
perform video annotation on the video image to obtain an annotation result of the video image; and
use the annotation result of the video image as an annotation result of each picture in the set of pictures to be annotated according to a correspondence between a video frame in the video image and a picture in the set of pictures to be annotated, wherein, in using the annotation result of the video image, the processor is further configured to:

split the video image into multiple frames corresponding to the set of pictures, after the video annotation is performed on the video image;

acquire an annotation result of a video frame corresponding to each picture from the annotation result of the video image according to a correspondence between a video frame in the split video image and each picture in the set of pictures to be annotated; and associate the annotation result of the video frame corresponding to each picture with the corresponding picture.

11. The device of claim 10, wherein the processor is further configured to:

acquire an annotation sample video frame in the video image; and use the annotation sample video frame as a video annotation sample to perform video annotation on another video frame in the video image, to obtain the annotation result of the video image.

12. The device of claim 11, wherein the processor is further configured to:

acquire an annotation sample picture in the set of pictures to be annotated; and acquire a video frame corresponding to the annotation sample picture in the video image as the annotation sample video frame.

13. The device of claim 11, wherein the processor is further configured to:

after converting the pictures in the set of pictures to be annotated into the video image, receive a video annotation request, and annotate a specified video frame in the video image; and acquire the annotated specified video frame as the annotation sample video frame.

14. The device of claim 11, wherein the processor is further configured to:

acquire an annotation object in the annotation sample video frame as a tracking target; and acquire the tracking target from another video frame in the video image, and generate an annotation at a location of the tracking target.

15. The device of claim 11, wherein the processor is further configured to:

annotate an adjacent video frame of the annotation sample video frame by using an optical flow method; and use the annotated video frame as a new annotation sample video frame to annotate an adjacent video frame of the new annotation sample video frame, until annotation of the video image is completed.

16. The device of claim 10, wherein before converting multiple pictures in the set of pictures to be annotated into the video image, the processor is further configured to:

receive a set of pictures to be processed, wherein the set of pictures to be processed comprises at least one group of multiple pictures obtained by continuous photographing; and receive a picture annotation request, wherein the picture annotation request comprises the set of pictures to be annotated, and the set of pictures to be annotated is a group of continuously photographed multiple pictures in the set of pictures to be processed.

17. The device of claim 10, wherein before converting multiple pictures in the set of pictures to be annotated into the video image, the processor is further configured to:
 determine whether the multiple pictures in the set of pictures to be annotated are a group of continuously photographed pictures, and if so, convert the multiple pictures in the set of pictures to be annotated into the video image.

18. A non-transitory computer-readable storage medium having stored therein instructions that, when executed by a processor of a device, cause the device to perform a picture annotation method, the method comprising:
 converting, into a video image, multiple pictures in a set of pictures to be annotated;
 performing video annotation on the video image to obtain an annotation result of the video image; and
 using the annotation result of the video image as an annotation result of each picture in the set of pictures to be annotated according to a correspondence between a video frame in the video image and a picture in the set of pictures to be annotated,
wherein the using the annotation result of the video image comprises:
splitting the video image into multiple frames corresponding to the set of pictures, after the video annotation is performed on the video image;
acquiring an annotation result of a video frame corresponding to each picture from the annotation result of the video image according to a correspondence between a video frame in the split video image and each picture in the set of pictures to be annotated; and
associating the annotation result of the video frame corresponding to each picture with the corresponding picture.

\* \* \* \* \*